(12) United States Patent
Fisher et al.

(10) Patent No.: US 9,259,877 B2
(45) Date of Patent: Feb. 16, 2016

(54) SYSTEM AND METHOD FOR APPLYING HEAT AND PRESSURE TO THREE-DIMENSIONAL ARTICLES

(71) Applicant: Nike, Inc., Beaverton, OR (US)

(72) Inventors: Sam Fisher, Portland, OR (US); Jared M. Kilmer, Vancouver, WA (US); Thomas Berend, Beaverton, OR (US); Tony H. Le, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 404 days.

(21) Appl. No.: 13/773,744

(22) Filed: Feb. 22, 2013

(65) Prior Publication Data

US 2014/0239556 A1 Aug. 28, 2014

(51) Int. Cl.
*B29C 51/46* (2006.01)
*B29D 35/04* (2010.01)
*A43D 9/00* (2006.01)

(52) U.S. Cl.
CPC . *B29C 51/46* (2013.01); *A43D 9/00* (2013.01); *B29D 35/04* (2013.01)

(58) Field of Classification Search
None
See application file for complete search history.

(56) References Cited

U.S. PATENT DOCUMENTS

| | | | |
|---|---|---|---|
| 1,731,024 A | 10/1929 | Richardson | |
| 3,141,183 A | 7/1964 | Ralphs | |
| 3,160,899 A * | 12/1964 | Bille et al. | 12/1 F |
| 3,228,049 A | 1/1966 | Sbicca | |
| 3,362,091 A | 1/1968 | Drago | |
| 3,803,655 A | 4/1974 | White et al. | |
| 3,855,657 A | 12/1974 | Mazzotta | |
| 3,938,211 A | 2/1976 | Armstrong | |
| 4,266,312 A | 5/1981 | Hall | |
| 4,290,838 A | 9/1981 | Reavill et al. | |
| 4,601,078 A | 7/1986 | Bertolaja | |
| 4,660,242 A | 4/1987 | Vornberger et al. | |
| 4,964,229 A | 10/1990 | Laberge | |
| 5,108,532 A | 4/1992 | Thein et al. | |
| 5,129,813 A | 7/1992 | Shepherd | |
| 5,275,775 A | 1/1994 | Riecken | |
| 5,296,182 A | 3/1994 | Thary | |
| 5,885,500 A | 3/1999 | Tawney et al. | |

(Continued)

FOREIGN PATENT DOCUMENTS

CH 285223 8/1952
CH 616094 A5 3/1980

(Continued)

OTHER PUBLICATIONS

International Search Report and Written Opinion mailed Jun. 2, 2014 in PCT/US2014/017242.

(Continued)

*Primary Examiner* — Monica Huson
(74) *Attorney, Agent, or Firm* — Plumsea Law Group, LLC

(57) ABSTRACT

A flexible manufacturing system can be used to fuse different layers of material together for forming an article of footwear. The system includes a base portion, an intermediate member and an upper member. The intermediate member includes a flexible membrane. The intermediate member can be sealed with the base portion and a vacuum can be provided to pull the flexible membrane over layers of material placed on the base portion. The upper member can be sealed against the intermediate member so that external pressure can be applied to the flexible membrane. The intermediate member and the upper member can be moved independently.

20 Claims, 19 Drawing Sheets

(56) References Cited

U.S. PATENT DOCUMENTS

| | | | |
|---|---|---|---|
| 5,940,991 | A | 8/1999 | Cabalquinto |
| 6,295,679 | B1 | 10/2001 | Chenevert |
| 6,299,817 | B1 | 10/2001 | Parkinson |
| 6,622,332 | B2 | 9/2003 | Furuhashi |
| 6,670,029 | B2 | 12/2003 | Norton et al. |
| 7,247,264 | B2 | 7/2007 | Buchler et al. |
| 8,162,022 | B2 | 4/2012 | Hull et al. |
| 2008/0028544 | A1 | 2/2008 | Park |
| 2008/0053609 | A1 | 3/2008 | Renz |
| 2008/0127426 | A1 | 6/2008 | Morlacchi et al. |
| 2008/0141469 | A1 | 6/2008 | Park |
| 2008/0250668 | A1 | 10/2008 | Marvin et al. |
| 2010/0051195 | A1 | 3/2010 | Damm |
| 2010/0115792 | A1 | 5/2010 | Muller et al. |
| 2010/0139853 | A1 | 6/2010 | Park |
| 2010/0275393 | A1 | 11/2010 | Jou et al. |
| 2011/0088282 | A1 | 4/2011 | Dojan et al. |
| 2012/0084999 | A1 | 4/2012 | Davis et al. |
| 2012/0102782 | A1 | 5/2012 | Swigart et al. |
| 2014/0223671 | A1 | 8/2014 | Fisher et al. |
| 2014/0237738 | A1 | 8/2014 | Johnson et al. |
| 2014/0237853 | A1 | 8/2014 | Fisher et al. |

FOREIGN PATENT DOCUMENTS

| | | | |
|---|---|---|---|
| EP | 0042136 | A1 | 12/1981 |
| EP | 0222964 | A1 | 5/1987 |
| EP | 0264896 | | 4/1988 |
| EP | 0264898 | A2 | 4/1988 |
| EP | 586360 | | 3/1994 |
| FR | 2 525 877 | A1 | 11/1983 |
| FR | 2562770 | A1 | 10/1985 |
| FR | 2895648 | A1 | 7/2007 |
| GB | 443696 | | 3/1936 |
| GB | 494885 | | 11/1938 |
| JP | H0516048 | A | 1/1993 |
| JP | 05057786 | | 3/1993 |
| JP | 9207149 | | 8/1997 |
| JP | 2004105323 | | 4/2004 |
| NL | 7714472 | A | 7/1979 |
| SU | 1639603 | A1 | 4/1991 |
| WO | 9003744 | | 4/1990 |
| WO | 0018267 | A1 | 4/2000 |
| WO | 0211571 | A1 | 2/2002 |
| WO | 02/067712 | A1 | 9/2002 |
| WO | 2004112525 | A1 | 12/2004 |
| WO | 2011082275 | | 7/2011 |

OTHER PUBLICATIONS

International Preliminary Report on Patentability and Written Opinion for Application No. PCT/US2014/015921, mailed Aug. 18, 2015.
International Search Report and Written Opinion for Application No. PCT/US2014/015921, mailed on Sep. 16, 2014.
International Search Report and Written Opinion for Application No. PCT/US2014/017239, mailed on Oct. 28, 2014.
International Search Report and Written Opinion for Application No. PCT/US2014/017240, mailed on Sep. 8, 2014.
International Preliminary Report on Patentability and Written Opinion of the International Searching Authority issued Sep. 3, 2015 in International Patent Application No. PCT/US2014/017242.
Final Office Action mailed Sep. 1, 2015 in U.S. Appl. No. 13/773,729.
International Preliminary Report on Patentability and Written Opinion of the International Searching Authority issued Sep. 3, 2015 in International Patent Application No. PCT/US2014/017240.
International Preliminary Report on Patentability and Written Opinion of the International Searching Authority issued Sep. 3, 2015 in International Patent Application No. PCT/US2014/017239.

\* cited by examiner

SYSTEM AND METHOD FOR APPLYING HEAT AND PRESSURE TO THREE-DIMENSIONAL ARTICLES

BACKGROUND

The present embodiments relate generally to flexible manufacturing systems for articles of footwear, articles of apparel and sporting equipment.

Methods of forming articles generally include steps of joining two or more materials. The materials can be joined, for example, using adhesives or stitching. The materials may often be joined while the materials have a two-dimensional (i.e., flattened) configuration.

SUMMARY

In one aspect, a flexible manufacturing system for articles of footwear includes a base portion, an intermediate member, where the intermediate member includes a frame member. The flexible manufacturing system further includes a flexible membrane and an upper member, where the upper member includes a cavity. The intermediate member can be sealed against the base portion. The upper member can be sealed against the intermediate member. The flexible manufacturing system can operate so that a vacuum is applied between the intermediate member and the base portion. The flexible manufacturing system can operate so that pressure in the cavity between the intermediate member and the upper member can be increased. The intermediate member and the upper member can move relative to the base portion and relative to one another.

In another aspect, a flexible manufacturing system for articles of footwear includes a base portion and an intermediate member, where the intermediate member further includes a frame member and a flexible membrane. The flexible manufacturing system also includes an upper member, where the upper member includes a cavity. The intermediate member is associated with a first height adjustment system that controls the height of the intermediate member above the base portion. The upper member is associated with a second height adjustment system that controls the height of the upper member above the base portion. The height of the intermediate member relative to the base portion and the height of the upper member relative to the base portion can be independently controlled.

In another aspect, a method of pressing materials for an article of footwear using a flexible manufacturing system includes associating at least one material layer with a base portion of the flexible manufacturing system. The method also includes lowering an intermediate member of the flexible manufacturing system onto the base portion so that the at least one material layer is sealed between the base portion and a flexible membrane of the intermediate layer. The method further includes lowering an upper member of the flexible manufacturing system onto the intermediate member and applying a vacuum between the intermediate member and the base portion. The method also includes increasing pressure in the region between the upper member and the intermediate member and thereby pressing the flexible membrane against the at least one material layer.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
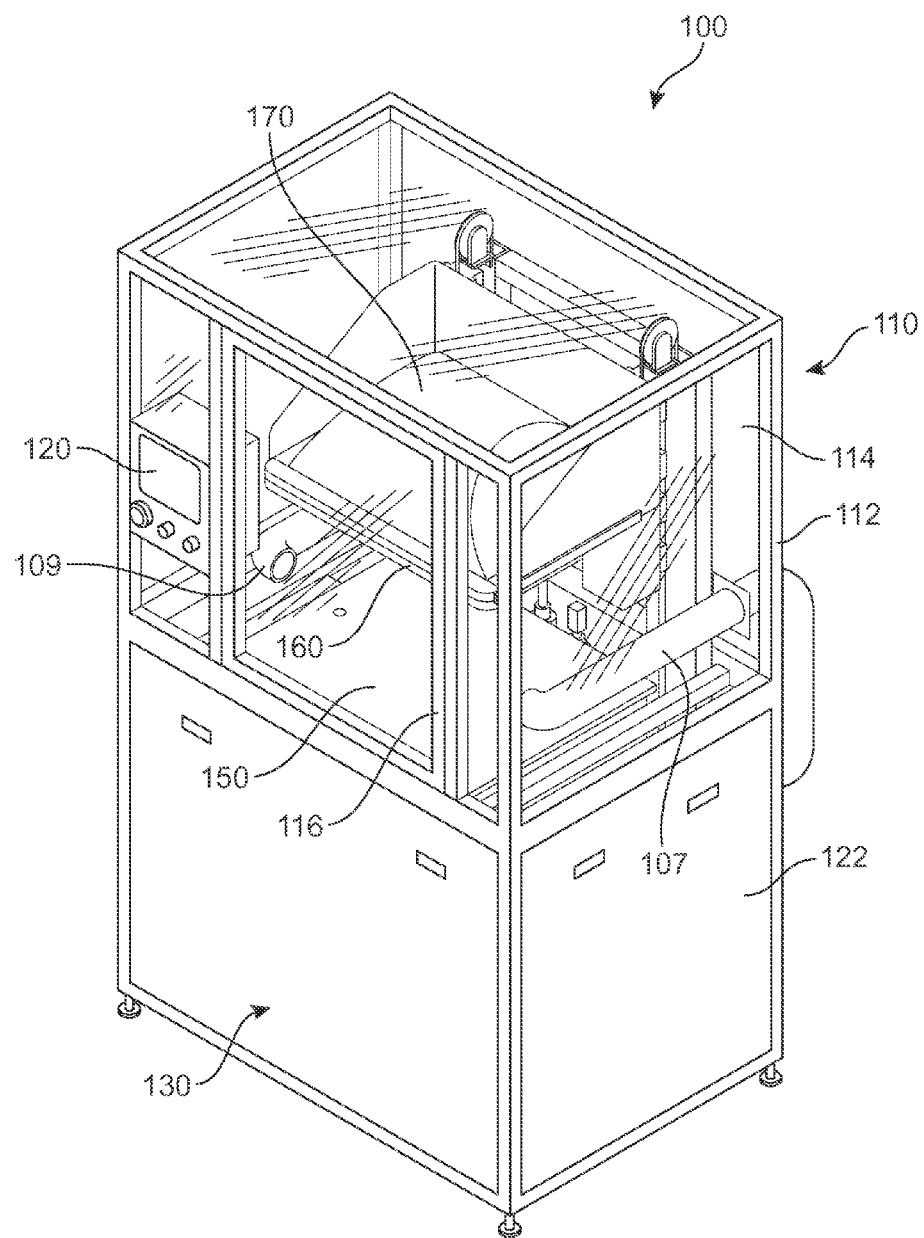
FIG. 1 is a schematic isometric front view of an embodiment of a flexible manufacturing system.
Figure 2:
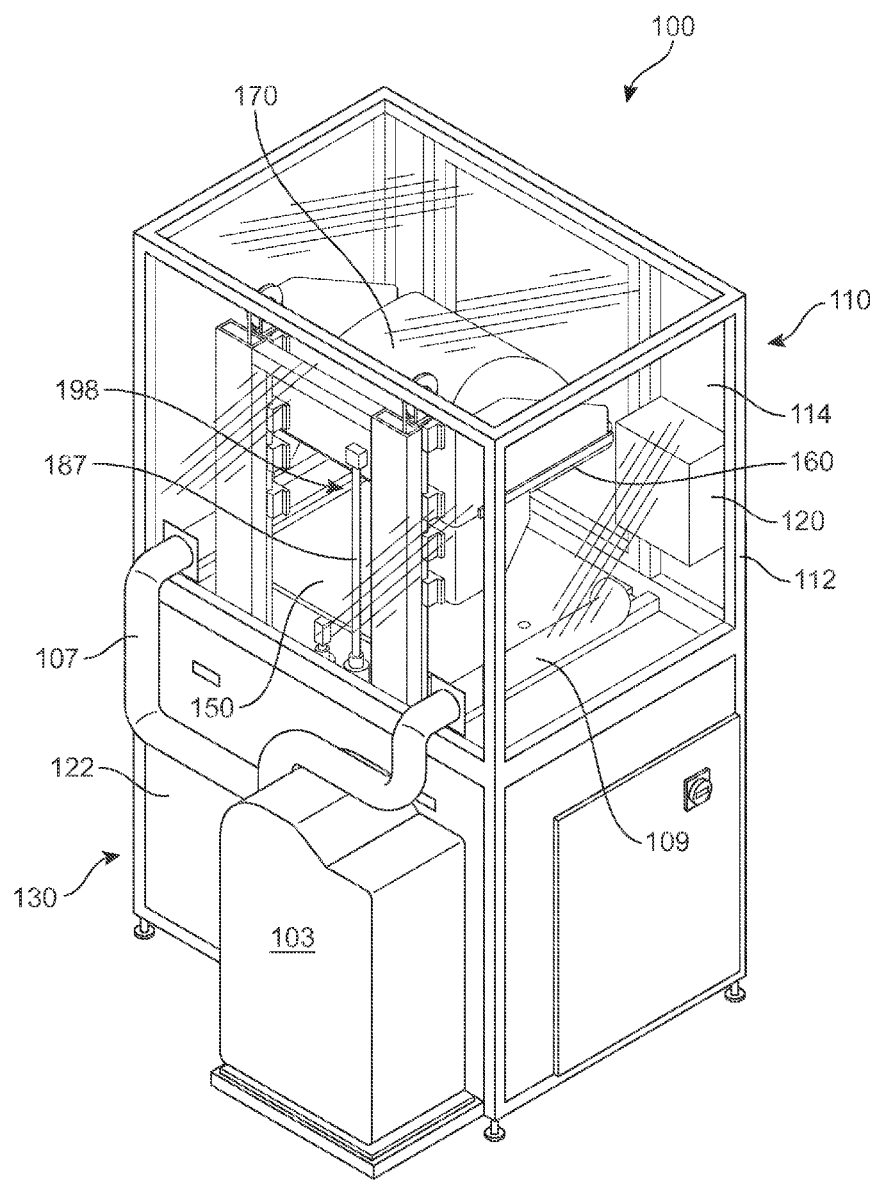
FIG. 2 is a schematic isometric rear view of an embodiment of a flexible manufacturing system.

FIGS. 1 and 2 illustrate schematic isometric views of an embodiment of a flexible manufacturing system 100. In some embodiments, flexible manufacturing system 100 may be intended for use with various kinds of articles including articles of footwear and/or articles of apparel. Flexible manufacturing system 100 may be used for a variety of purposes, including for example, fusing two or more materials together using pressure and/or heat. One such method for fusing materials together to form portions of an article of footwear are disclosed in Fisher et al., U.S. Patent Application Publication Number 2014/0223671, now U.S. patent application Ser. No. 13/767,011, filed Feb. 14, 2013, and titled "Last with Retractable Pins", the entirety of which is hereby incorporated by reference. As another example, flexible manufacturing system 100 may be used to transfer graphics from a source material to a portion of an article using pressure and/or heat. One such example of a graphic transfer method that uses pressure and heat is disclosed in Hull, U.S. Pat. No. 8,162,022, issued Apr. 24, 2012, the entirety of which is hereby incorporated by reference. Therefore, it will be understood that the flexible manufacturing system 100 of the embodiments discussed below may be utilized for a variety of different purposes where it may be necessary to apply pressure and/or heat over portions of an article (i.e., footwear and/or apparel). Moreover, the provisions described to facilitate fusing, bonding, graphic transfer, material shaping, as well as a variety of other functions may be useful with three-dimensional/contoured as well as substantially flat articles.

For clarity, the following detailed description discusses embodiments where a flexible manufacturing system is used to apply pressure and/or heat to an article of footwear. Generally, the flexible manufacturing system can be used with any kinds of footwear including, but not limited to: hiking boots, soccer shoes, football shoes, sneakers, rugby shoes, basketball shoes, baseball shoes, running shoes as well as other kinds of shoes. While the embodiments in the figures show a single article, it will be understood that a flexible manufacturing system could be used with two or more articles, including articles that make up a pair of footwear.

A flexible manufacturing system need not be limited to use with articles of footwear and the principles taught throughout this detailed description may be applied to additional articles as well. Generally, these principles could be applied to any article kinds of articles. Examples of articles that can be used with the flexible manufacturing system include, but are not limited to: footwear, gloves, shirts, pants, socks, scarves, hats, jackets, as well as other articles. Other examples of articles that may be used include, but are not limited to: shin guards, knee pads, elbow pads, shoulder pads, as well as any other type of protective equipment. Additionally, in some embodiments, the article could be another any other type of article, including, but not limited to: balls, bags, purses, backpacks, as well as other articles. Moreover, the article may be any article that can be worn or may be an article that is not generally worn.

Flexible manufacturing system 100 may comprise an upper enclosure 110 that encloses a variety of components. In some embodiments, upper enclosure 110 may comprise a plurality of frame portions 112 that support a plurality of panels 114. In some embodiments, plurality of panels 114 may be substantially transparent panels. For example, in some embodiments, plurality of panels 114 could comprise a substantially durable and transparent material such as, but not limited to: various kinds of polymers including polymethyl methacrylate (acrylic), glass, as well as possibly other materials.

In some embodiments, upper enclosure 110 may further include door 116. Door 116 may be opened to allow an operator access to the interior of upper enclosure 110. With door 116 closed, upper enclosure 110 may generally provide a protective enclosure around the internal components of flexible manufacturing system 100.

In some embodiments, flexible manufacturing system 100 may include an interface device 120. In some embodiments, interface device 120 may include provisions for input and/or output of components internal to upper enclosure 110. For example, in some embodiments, interface device 120 may comprise buttons that allow an operator to control the operating state of various components, as discussed in further detail below. In some embodiments, interface device 120 may also include a display for providing output to a user (e.g., a pressure reading, system mode, etc.). The display could be any kind of display including an LCD, LED, CRT, as well as any other kind of display. As an example, a display for interface device 120 could be used to show a current pressure reading in one or more regions of the system. As another example, a display for interface device 120 could be used to show the temperature associated with one or more components and/or regions of the system. Although not shown in the figures, it will be understood that in some embodiments, one or more components of flexible manufacturing system 100 could be in communication with a computing device (such as a computer and/or network of computers, a mobile computing device, a tablet computing device, etc.). Such external computing devices could be used to facilitate control of flexible manufacturing system 100, including control from a remote location.

Some embodiments may further include a lower cabinet 130. In some embodiments, lower cabinet 130 may house additional components of flexible manufacturing system 100. In some cases, lower cabinet 130 may comprise a plurality of panels 122 that enclose components along the lower portion of flexible manufacturing system 100. In some embodiments, plurality of panels 122 may be substantially opaque and could be made of any materials including, but not limited to: polymers, wood, glass, metal as well as possibly other materials.

Figure 3:
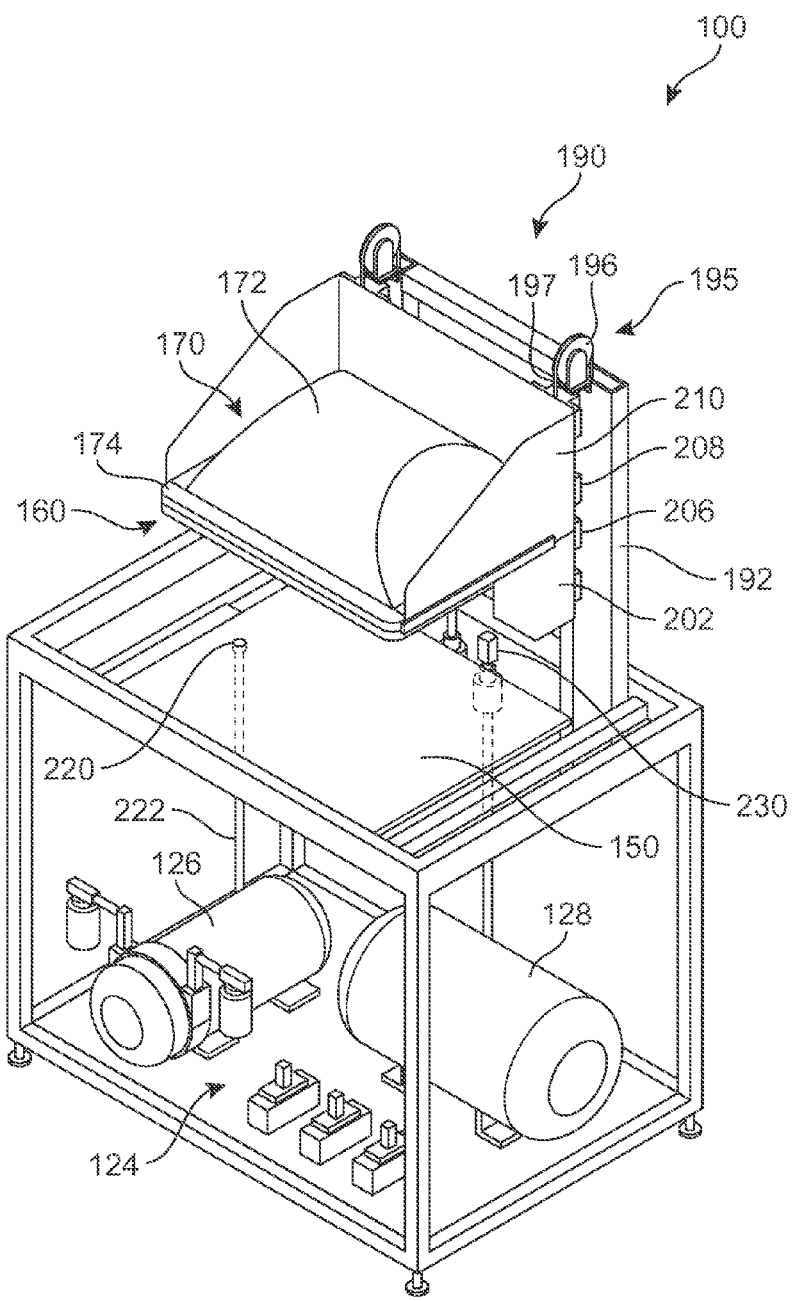
FIG. 3 is a schematic isometric view of a flexible manufacturing system in which some internal components are visible.

FIG. 3 illustrates an isometric view of an embodiment of flexible manufacturing system 100, in which portions of upper enclosure 110 and lower cabinet 130 have been removed to better show internal components. Referring to FIG. 3, some embodiments of flexible manufacturing system 100 may include a pressure control system 124. Pressure control system 124 may comprise a variety of components including fluid pumps, fluid tanks as well as other provisions for controlling the flow of fluid to and/or from one or more locations or components of flexible manufacturing system 100. In some embodiments, pressure control system 124 may include fluid pump 126. In some embodiments, fluid pump 126 may be operated to decrease pressure (or create a vacuum) within a region that is in fluid communication with fluid pump 126. Generally any kinds of pumps may be used. Examples of pumps that may be used include, but are not limited to: positive displacement pumps (such as rotary pumps, reciprocating pumps, linear pumps), velocity pumps, gravity pumps, as well as other kinds of pumps. In some embodiments, pressure control system 124 may also include fluid tank 128. In some embodiments, fluid tank 128 may be filled with a compressed fluid, such as air. Thus, fluid tank 128 could be used to deliver pressurized air to a region in fluid communication with fluid tank 128, thereby increasing the pressure of the connected region. Although the embodiments illustrate a compressed fluid tank for delivering pressurized fluid (e.g., air) to one or more regions of the system, other embodiments could utilize a pump for pumping fluid into a region. In some cases, fluid tank 128 may be further associated with a pump for maintaining fluid tank 128 at a predetermined pressure. Such a pump (not shown) could be attached to fluid tank 128. In still other cases, fluid tank 128 could be in fluid communication with fluid pump 126, thereby allowing fluid pump 126 to maintain fluid tank 128 at a constant pressure.

Figure 4:
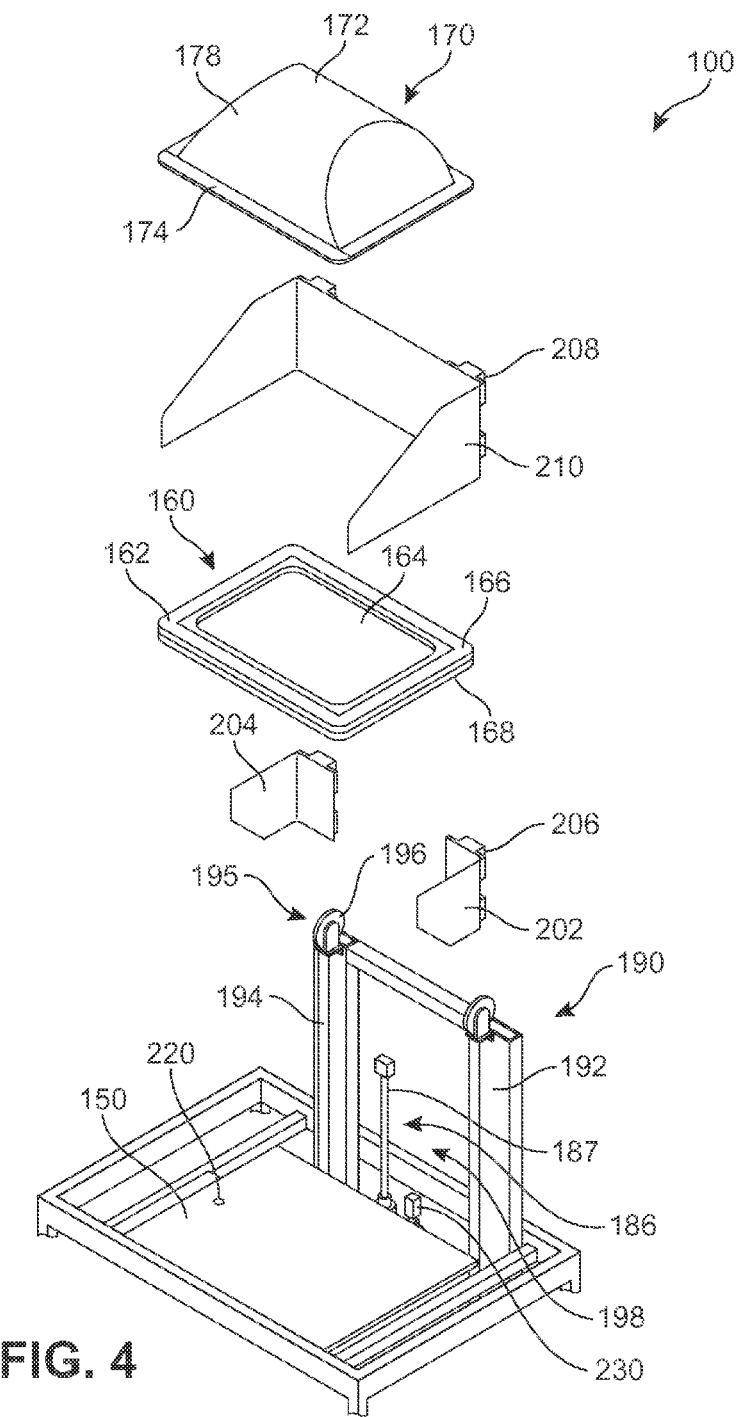
FIG. 4 is a schematic isometric exploded view of some components of a flexible manufacturing system.

FIG. 4 illustrates an isometric exploded view of some components of flexible manufacturing system 100. Referring now to FIGS. 1-4, flexible manufacturing system 100 may include base portion 150. In some embodiments, base portion 150 may comprise a platform or generally flat structure to support articles of various kinds, including articles of footwear and/or articles of apparel. In some embodiments, base portion 150 may be arranged at the bottom of upper enclosure 110.

Base portion 150 may or may not include further provisions for supporting an article. Some embodiments, for example, could include a stand, fixture and/or jig for holding an article and/or last.

Flexible manufacturing system 100 may also include intermediate member 160. In some embodiments, intermediate member 160 may further include an outer frame member 162 and a flexible membrane 164 that is mounted within outer frame member 162 (see FIG. 4). In particular, in some cases, outer frame member 162 may include a first frame portion 166 and a second frame portion 168 that may be joined together. Furthermore, the edges of flexible membrane 164 may be fixed in place along the regions where first frame portion 166 and second frame portion 168 are joined together.

In different embodiments, the materials used for flexible membrane 164 could vary. Examples of flexible materials that may be used include, but are not limited to: flexible textiles, natural rubber, synthetic rubber, silicone, elastomers, other elastomers such as silicone rubber, as well as other materials known in the art. Furthermore, materials for outer frame member 162 could vary in different embodiments. In contrast to flexible membrane 164, some embodiments may include a substantially rigid outer frame member 162. Exemplary materials that could be used for an outer frame member include, but are not limited to: metals, wood, plastic as well as possibly other materials.

In some embodiments, flexible manufacturing system 100 may include an upper member 170. As seen in FIGS. 3 and 4, upper member 170 may include a central contoured portion 172 that extends out to a peripheral edge 174. Central contoured portion 172 may include a concave inner side 176 (see FIG. 12) and a concave outer side 178, which generally faces away from intermediate member 160. The concave inner side 176 may be associated with a cavity 180 (see FIG. 12).

In different embodiments, the geometry of upper member 170 can vary. Although the current embodiment illustrates a generally rounded shape for central contoured portion 172, in other embodiments a central portion could have any other shape including, for example, a rectangular or box-like shape. Moreover, in some embodiments, the geometry may be selected to achieve a desired interior volume for cavity 180.

As clearly seen in FIGS. 3 and 4, base portion 150, intermediate member 160 and upper member 170 could be approximately parallel in some embodiments. More specifically, base portion 150 and intermediate portion 160 may be approximately parallel with one another and with a plane corresponding to outer peripheral edge 174 of upper member 170. This generally parallel arrangement allows adjacent portions to contact one another in a way that creates a sealed region between the adjacent portions, as described in further detail below.

Some embodiments can include provisions for positioning intermediate member 160 and/or upper member 170. In some embodiments, provisions for moving intermediate member 160 and upper member 170 to various positions relative to base portion 150 may be included. In some embodiments, flexible manufacturing system 100 includes provisions for independently moving intermediate member 160 and upper member 170 to various different positions relative to base portion 150. In some embodiments, flexible manufacturing system 100 includes provisions for independently moving intermediate member 160 and upper member 170 to various different vertical positions above base portion 150.

In some embodiments, flexible manufacturing system 100 may include positioning assembly 190. Positioning assembly 190 may include various components and/or systems that facilitate the positioning of intermediate member 160 and/or upper member 170. In some embodiments, positioning assembly 190 may include first support member 192 and second support member 194. In some cases, first support member 192 and second support member 194 may extend in a vertical direction, or perpendicular direction, to base portion 150. In some embodiments, first support member 192 and second support member 194 help support intermediate member 160 and/or upper member 170. Moreover, in some embodiments, first support member 192 and second support member 194 may facilitate the movement of intermediate member 160 and/or upper member 170 in a direction generally perpendicular to base portion 150.

In some embodiments, positioning assembly 190 may further include one or more height adjustment systems. In some embodiments, a first height adjustment system may include a plurality of components used to adjust the vertical position, or height, of intermediate member 160 relative to base portion 150. Various components and systems can be used to adjust the height of intermediate member 160, including, but not limited to: hydraulic systems, pneumatic systems, pulley-based systems, motorized systems as well as other kinds of components and systems.

In some embodiments, positioning assembly 190 may also include a second height adjustment system used to adjust the vertical position, or height, of upper member 170 relative to base portion 150. The second height adjustment system can comprise any of the systems or components described above for the first height adjustment system. In some embodiments, the first height adjustment system and second height adjustment system may be substantially identical systems that utilize similar components and methods for raising and lowering intermediate member 160 and upper member 170, respectively. Moreover, it is contemplated that in some embodiments, the first height adjustment system and the second height adjustment system may comprise a single system that is operated to independently adjust the positions of intermediate member 160 and upper member 170.

The embodiments depict exemplary height adjustment systems. In some embodiments, a first height adjustment system 195 may utilize pulleys 196 and cables 197 (shown in FIG. 3) to raise and lower upper member 170. For purposes of clarity, components of first height adjustment system 195 are shown schematically. Moreover, in some embodiments, cables 197 may be driven using one or more motors (not shown). For example, in some embodiments a motor could be used to wind or unwind cables 197 from corresponding reels, thereby raising or lowering upper member 170 to different heights above base portion 150.

In some embodiments, a second height adjustment system 198 may incorporate an extendable rod system 186. Extendable rod system 186 may include a rod portion 187 that extends upwardly from a location adjacent to, or below, base portion 150. Rod portion 187 may be further attached to intermediate member 160 (see FIG. 2). With this arrangement, rod portion 187 may be used to raise and lower intermediate member 160.

Extendable rod system 186 may utilize a variety of different technologies for raising and lowering rod portion 187. These technologies include, but are not limited to: pneumatic technologies, hydraulic technologies, electro-mechanical technologies as well as other technologies. In one embodiment, extendable rod system 186 uses pneumatic pressure to raise and lower rod portion 187.

As seen in FIGS. 3 and 4, some embodiments may incorporate various provisions that facilitate attachment and support of components that are raised and/or lowered (i.e., intermediate member 160 and upper member 170). In some embodiments, for example, intermediate member 160 may be further associated with first support panel 202 and second support panel 204, that extend downwardly from opposing sides of intermediate member 160. First support panel 202 and second support panel 204 may provide support along the sides of intermediate member 160 and may be further used to connect intermediate member 160 with first support member 192 and second support member 194. In some embodiments, first support panel 202 and second support panel 204 may include a first set of guide members 206. First set of guide members 206 may connect intermediate member 160 with first support member 192 and second support member 194 in a manner that allows intermediate member 160 to slide along the length of first support member 192 and second support member 194 (i.e., in a direction perpendicular to base portion 150).

In some embodiments, upper member 170 may include bracketing portion 210, which may be used to connect upper member 170 with first support member 192 and second support member 194. In some embodiments, bracketing portion 210 may include a second set of guide members 208. Second set of guide members 208 may connect upper member 170 with first support member 192 and second support member 194 in a manner that allows upper member 170 to slide along the length of first support member 192 and second support member 194 (i.e., in a direction perpendicular to base portion 150).

Embodiments may include components for delivering fluid to and/or from various regions of flexible manufacturing system 100. In some embodiments, vacuum pressure can be provided to a region enclosed between base portion 150 and intermediate member 160, when intermediate member 160 is disposed against base portion 150 (as discussed below). In one embodiment, for example, base portion 150 may include a fluid port 220. Fluid port 220 may be in fluid communication with fluid pump 126 via a fluid line 222. This arrangement may allow a vacuum to be drawn in the region between base portion 150 and intermediate member 160, as discussed in further detail below. Of course, this configuration is only intended to be exemplary and in other embodiments any other configuration for drawing a vacuum in the region between base portion 150 and intermediate member 160 could be used. In particular, any combination of fluid ports, fluid valves, holes, and/or openings having any number of shapes and sizes could be disposed on base portion 150 and/or intermediate portion 160.

In some embodiments, increased fluid pressure (e.g., air pressure) can be provided in the region between upper member 170 and intermediate member 160 when these members are disposed adjacent to one another. In one embodiment, for example, flexible manufacturing system 100 may include fluid connecting member 230. Fluid connecting member 230 may be configured to provide fluid communication between cavity 180 (see FIG. 12) of upper member 170 and fluid tank 128. In particular, fluid connecting member 230 may be disposed adjacent to base portion 150, and may connect with upper member 170 when upper member 170 is in a fully lowered position (for example by engaging a corresponding connector on upper member 170 or by being placed within cavity 180 directly). This arrangement may allow the pressure of cavity 180 to be increased when upper member 170 is in a lowered position and sealed against intermediate member 160. More specifically, with upper member 170 sealed against intermediate member 160, fluid connecting member 230 can be controlled to allow (compressed) air to flow from fluid tank 128 to cavity 180 and thereby increase the pressure of cavity 180.

Some embodiments may include provisions to support articles (and/or equipment) placed on base portion 150. For example, embodiments used for forming uppers for articles of footwear may include a footwear last. The footwear last can be placed onto, and/or mounted directly to, base portion 150. One exemplary footwear last that may be used is disclosed in Fisher et al., U.S. Patent Application Publication Number 2014/0237853, now U.S. patent application Ser. No. 13/773,771, filed Feb. 22, 2013, and titled "Bottom Down Last for 3D Forming", the entirety being herein incorporated by reference. This document is hereafter referred to as "the bottom down last" application.

Additionally, some other embodiments could include provisions to direct and/or focus the vacuum pressure generated at base portion 150. In some embodiments, flexible manufacturing system 100 may further include a removable base plate with one or more holes (or perforations) that can be placed over base portion 150. The configuration of holes on the base plate may be used to create particular regions of higher suction. This may facilitate greater control in temporarily fixing the position of an article and may also focus the vacuum pressure along particular portions of a flexible membrane.

Some embodiments may include provisions for cooling one or more components. Referring back to FIGS. 1 and 2, some embodiments of flexible manufacturing system 100 may include air-conditioning unit 103. Air-conditioning unit 103 may further include a first conduit 107 and a second conduit 109, which may deliver cooled air to a region adjacent base portion 150. As discussed in further detail below, this configuration allows for the cooling of one or more components following the bonding process.

Figure 5:
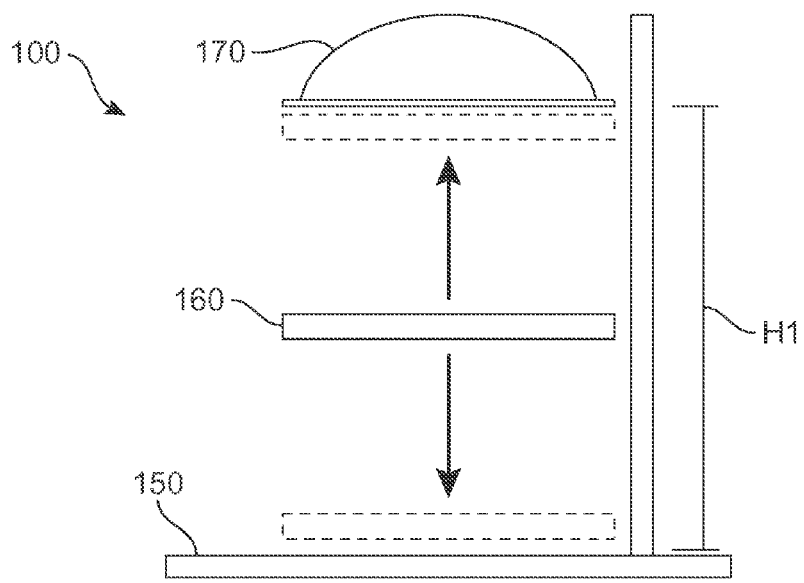
FIG. 5 is a side schematic view of some components of a flexible manufacturing system.
Figure 6:
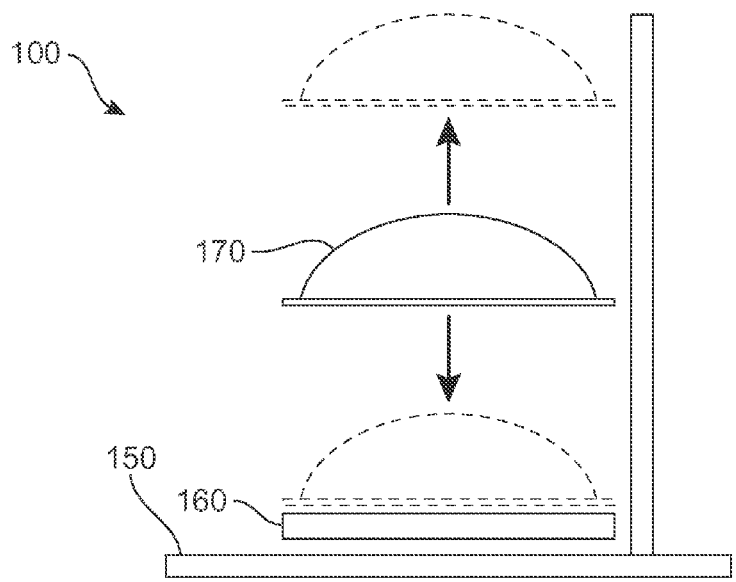
FIG. 6 is a side schematic view of some components of a flexible manufacturing system.

FIGS. 5 and 6 illustrate side schematic views of an embodiment of some components of flexible manufacturing system 100. In particular, FIGS. 5 and 6 are intended to illustrate the ranges of motion for intermediate member 160 and upper member 170. For example, referring first to FIG. 5, with upper member 170 raised to a maximum height H1, intermediate member 160 can be translated to any height between upper member 170 and base portion 150. Moreover, it is clear that as intermediate member 160 is lowered to base portion 150, the spacing between intermediate member 160 and upper member 170 is generally increased (as long as upper member 170 stays at maximum height H1). In a corresponding manner, as seen in FIG. 6, with intermediate member 160 lowered to a position directly adjacent to base portion 150, upper member 170 can be translated to any position above intermediate member 160. More specifically, upper member 170 can be translated to any position between maximum height H1 and a minimum height directly adjacent to intermediate member 160.

FIGS. 5 and 6 are intended to illustrate a variety of possible configurations for intermediate member 160 and upper member 170. It will be understood that a variety of other possible configurations or positions for intermediate member 160 and upper member 170 are possible.

FIGS. 7-18 illustrate schematic views of the general operation of flexible manufacturing system 100. These embodiments describe a method for fusing two or more materials together while the materials are on a three-dimensional form (such as a footwear last). However, it will be understood that flexible manufacturing system 100 may be used for a variety of different purposes, including, for example, transferring graphics from a carrier layer to a portion of an article of footwear and/or apparel.

Figure 7:
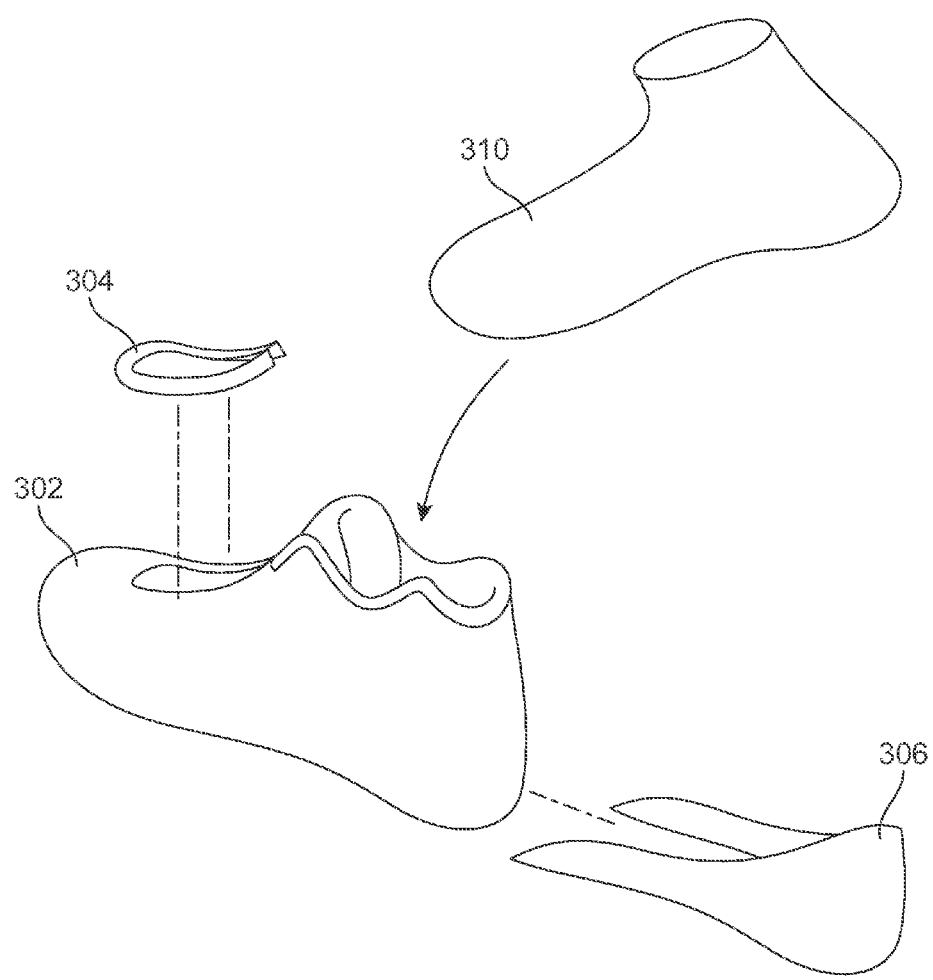
FIG. 7 is a schematic isometric view of an embodiment of an article of footwear and a last, including trim portions for fusing to the article of footwear.

FIG. 7 illustrates an embodiment of components for forming an upper for an article of footwear. Referring to FIG. 7, a base layer 302, a first trim layer 304 and a second trim layer 306 may be associated with a footwear last 310. In particular, base layer 302, first trim layer 304 and second trim layer 306 may comprise layers to be joined in order to form a footwear upper. In some cases, first trim layer 304 and second trim layer 306 may be temporarily fixed in place on base layer 302 using, for example, a temporary adhesive. In other embodiments, first trim layer 304 and second trim layer 306 could be temporarily joined with base layer 302 using various kinds of welds, such as an ultrasonic weld. Still other joining methods that could be used include pressure sensitive adhesives (PSA's). In still further embodiments, one or more layers could be temporarily joined using retractable pins associated with a last.

In order to maintain a three-dimensional geometry for base layer 302 throughout the joining process, footwear last 310 may be inserted into base layer 302. This allows base layer 302 to maintain the desired three-dimensional shape for an upper while undergoing pressure applied by flexible membrane 164 (as discussed below).

The operation of flexible manufacturing system 100 may be characterized with reference to different operating modes. For example, a first operating mode may refer to a configuration in which intermediate member 160 is lowered against base portion 150 so that a fluid seal is formed between intermediate member 160 and base portion 150, while upper member 170 is spaced apart from intermediate member 160. Likewise, a second operating mode may refer to a configuration in which intermediate member 160 is lowered against base portion 150 and upper member 170 is lowered against intermediate member 160. Moreover, in this second operating mode, a fluid seal may be formed between upper member 170 and intermediate member 160. Of course it will be understood that these particular configurations are only some of the possible configurations for intermediate member 160 and intermediate member 160.

Figure 8:
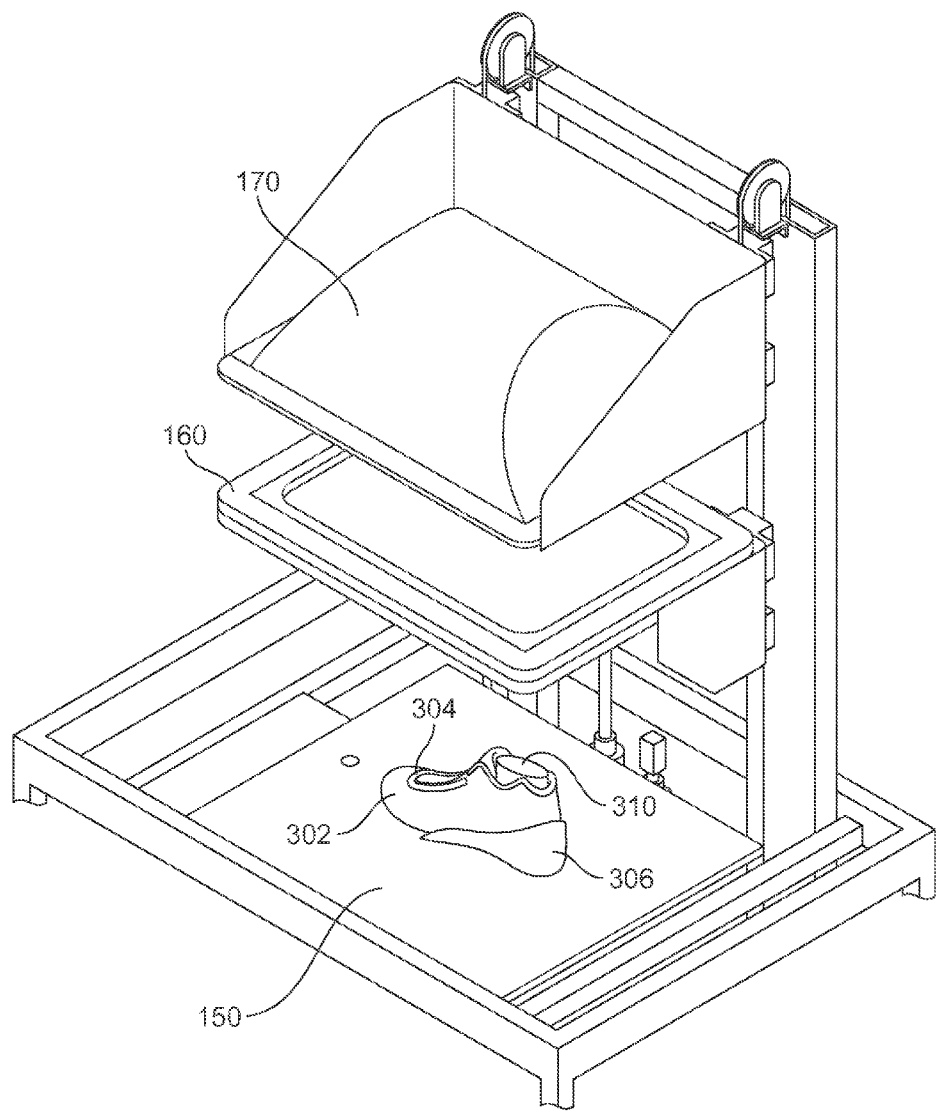
FIG. 8 is an isometric schematic view of an embodiment of a footwear last and upper material placed on a base portion of a flexible manufacturing system.

Referring next to FIG. 8, footwear last 310 and the associated base layer 302, first trim layer 304 and second trim layer 306 may be placed on base portion 150. This may occur when intermediate member 160 and upper member 170 are raised above base portion 150 with enough clearance to allow footwear last 310 to be placed on base portion 150.

Figure 9:
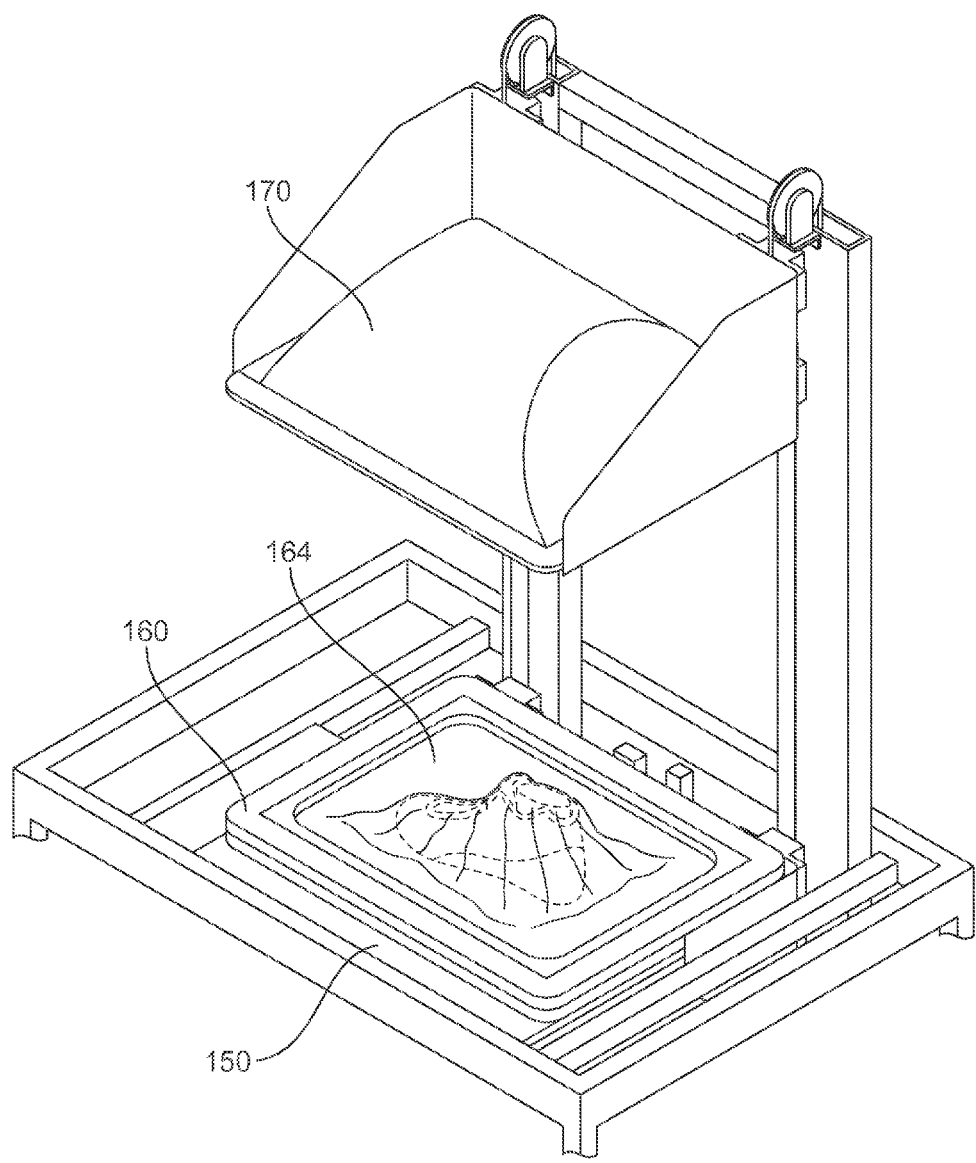
FIG. 9 is an isometric schematic view of an embodiment of an intermediate member being lowered onto a base portion of a flexible manufacturing system.

Referring next to FIG. 9, intermediate member 160 may be lowered. In particular, intermediate member 160 may be lowered until intermediate member 160 comes into contact with base portion 150. In some embodiments, intermediate member 160 may contact base portion 150 in a manner that provides a fluid seal between intermediate member 160 and base portion 150. This sealed configuration may facilitate later steps of applying a vacuum within the region between intermediate member 160 and base portion 150.

Figure 10:
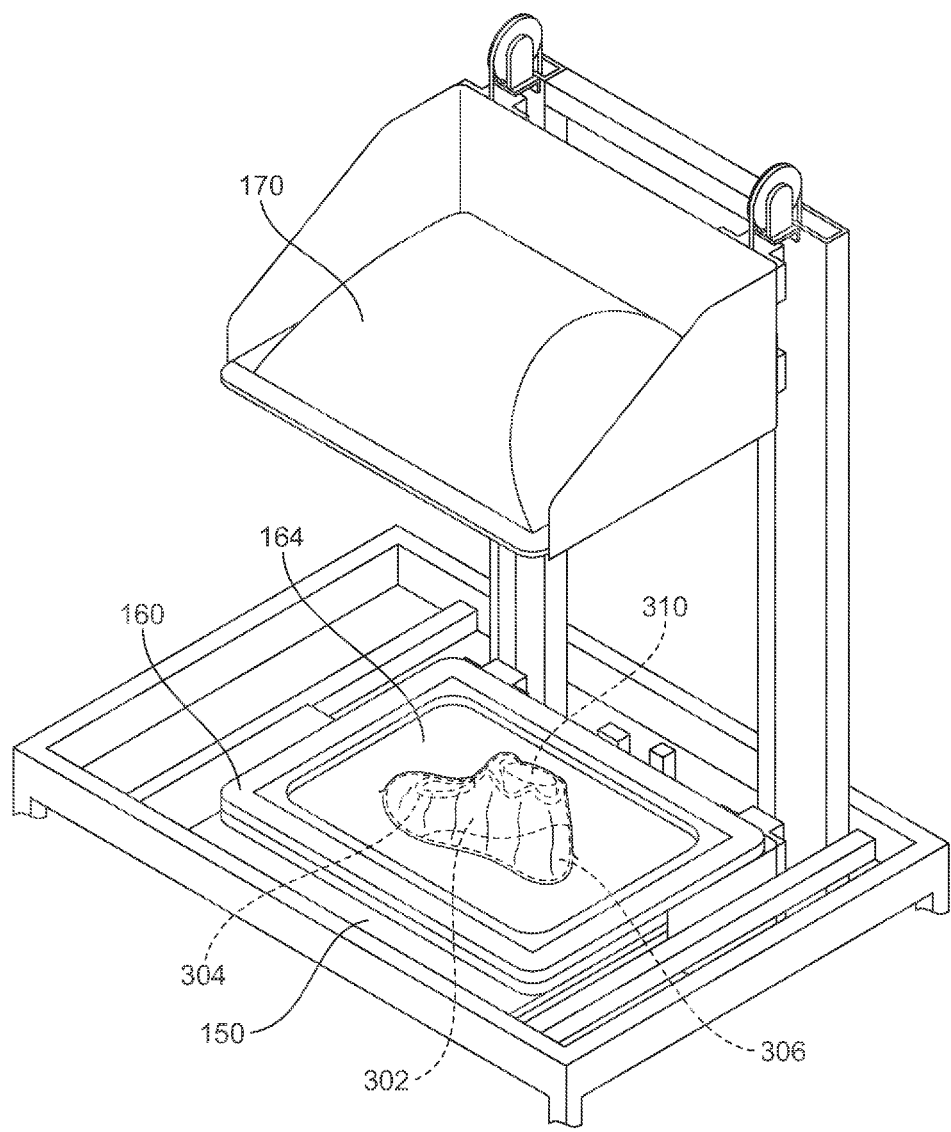
FIG. 10 is an isometric schematic view of an embodiment of an intermediate member conforming to the shape of a footwear last using a vacuum.

Referring now to FIG. 10, a vacuum may be applied between intermediate member 160 and base portion 150. As the pressure between intermediate member 160 and base portion 150 decreases, the environment may apply a force that presses flexible membrane 164 against base layer 302, first trim layer 304 and second trim layer 306. This has the effect of pressing base layer 302 as well as first trim layer 304 and second trim layer 306 between flexible membrane 164 and footwear last 310. This pressure may help to fuse first trim layer 304 and second trim layer 306 to base layer 302 in order to form a three-dimensional upper.

Figure 11:
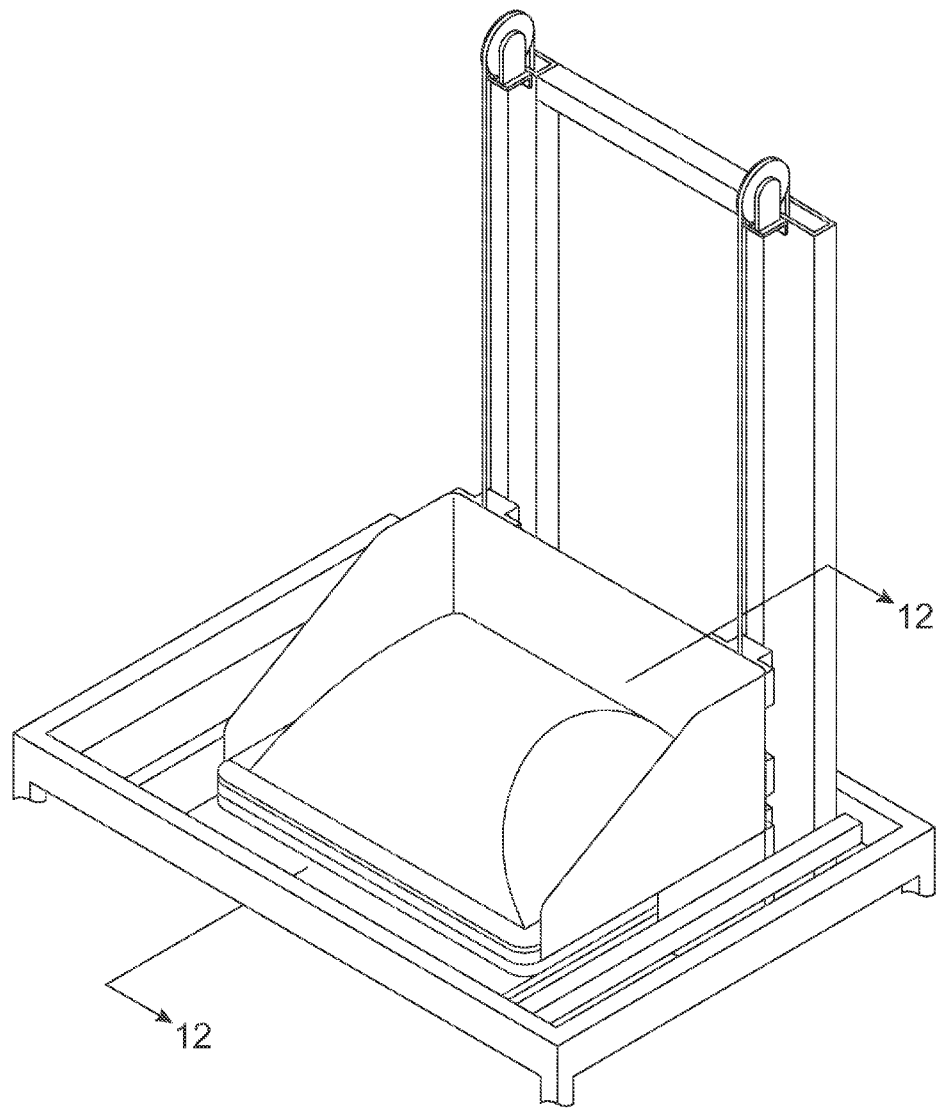
FIG. 11 is an isometric schematic view of an embodiment of an upper member lowering over an intermediate member.

In order to increase the forces with which base layer 302, first trim layer 304 and second trim layer 306 are squeezed between flexible membrane 164 and footwear last 310, the outward pressure on flexible membrane 164 may be increased. In some embodiments, this can be achieved by lowering upper member 170 until upper member 170 comes into contact with intermediate member 160, as shown in FIG. 11. In some embodiments, upper member 170 may contact intermediate member 160 in a manner that provides a fluid seal between upper member 170 and intermediate member 160.

Figure 12:
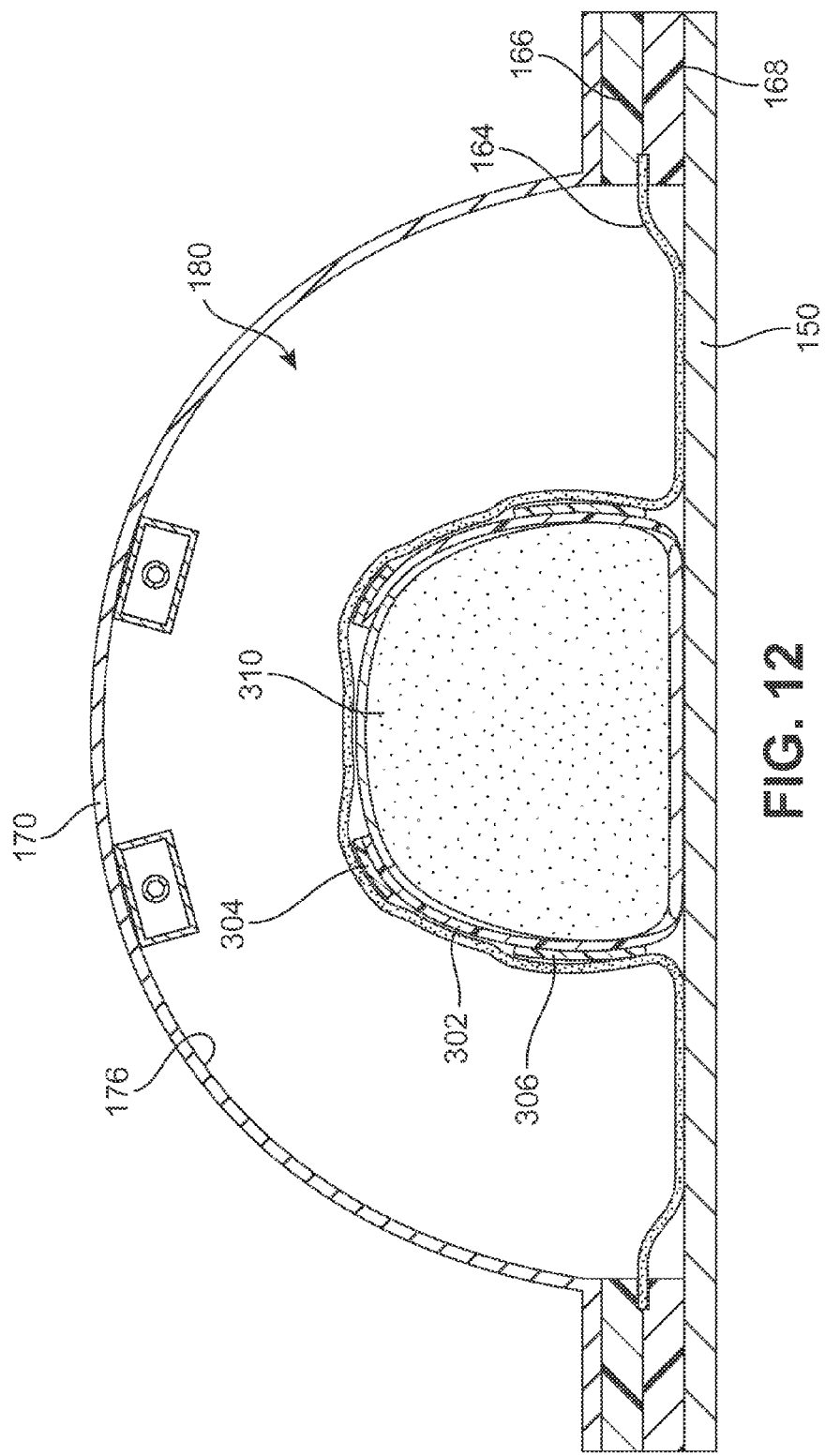
FIG. 12 is a cross sectional view of an embodiment of components of a flexible manufacturing system.
Figure 13:
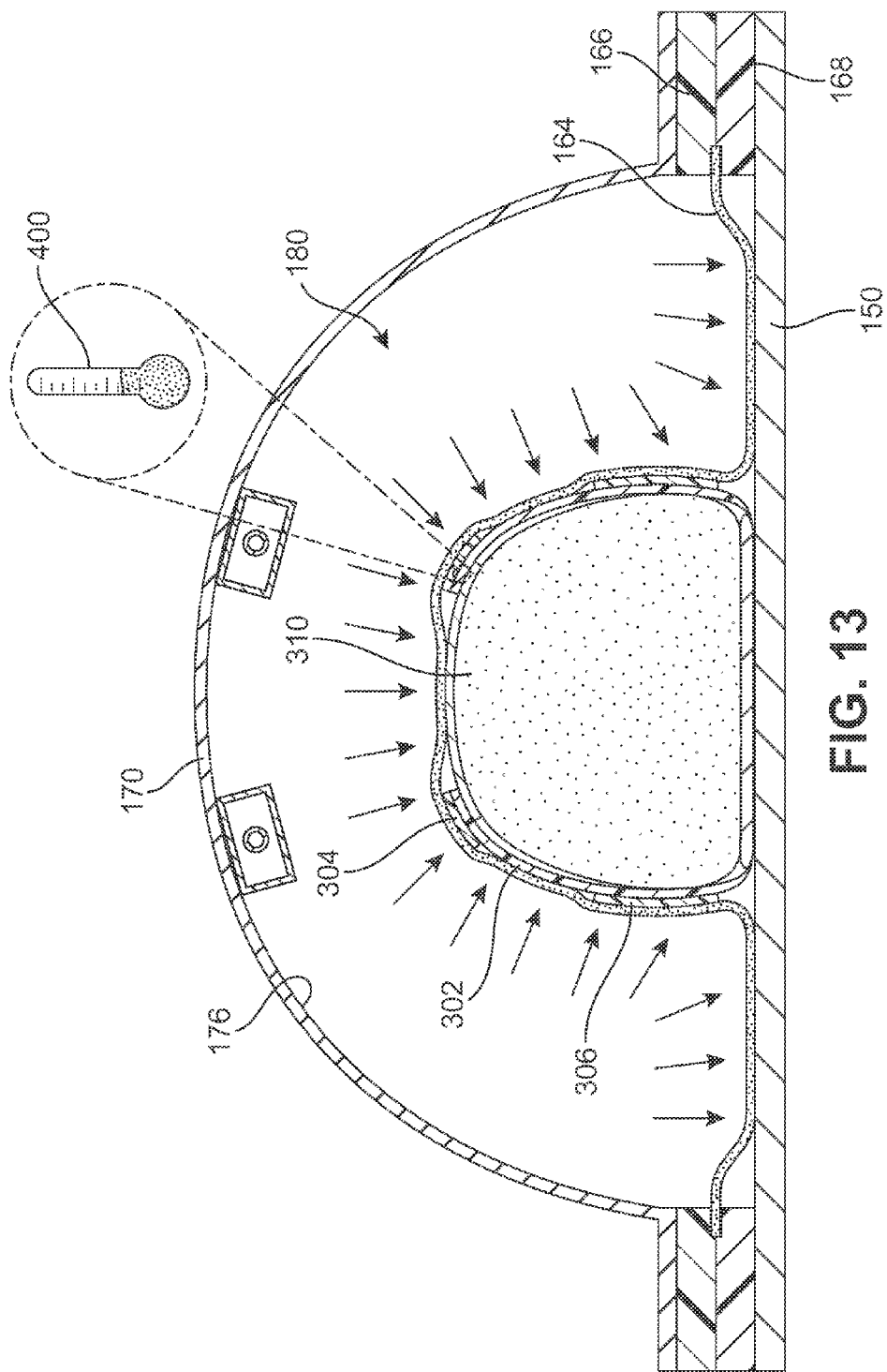
FIG. 13 is a cross sectional view of an embodiment of components of a flexible manufacturing system, in which pressure is increased within an upper member.

FIG. 12 illustrates a cross-sectional view of portions of flexible manufacturing system 100 as well as footwear last 310, base layer 302, first trim layer 304 and second trim layer 306. Specifically, this cross section may occur at the location and direction indicated in FIG. 11. As seen in FIG. 12, the cross-section occurs at a location where portions of footwear last 310, base layer 302, first trim layer 304 and second trim layer 306 can all be seen. Although the embodiments depict a substantially solid footwear last 310, other embodiments could utilize a hollow last. One potential hollow last with a corresponding hollow base is disclosed in "the bottom down last" application, which has been cited (and incorporated by reference) above.

Referring to FIG. 12, with upper member 170 disposed against intermediate member 160, cavity 180 of upper member 170 may be sealed such that fluid can only enter through fluid connecting member 230 (see FIG. 4). In order to increase the pressure applied to base layer 302, first trim layer 304 and second trim layer 306, the pressure of cavity 180 may be increased, as shown schematically in FIG. 13. As the pressure within cavity 180 is increased, the magnitude of the forces pushing flexible membrane 164 against base layer 302, first trim layer 304 and second trim layer 306 are substantially increased. This additional pressure on flexible membrane 164 that results from the increased pressure within cavity 180 may help increase bond strengths between layers that are to be joined.

Figure 14:
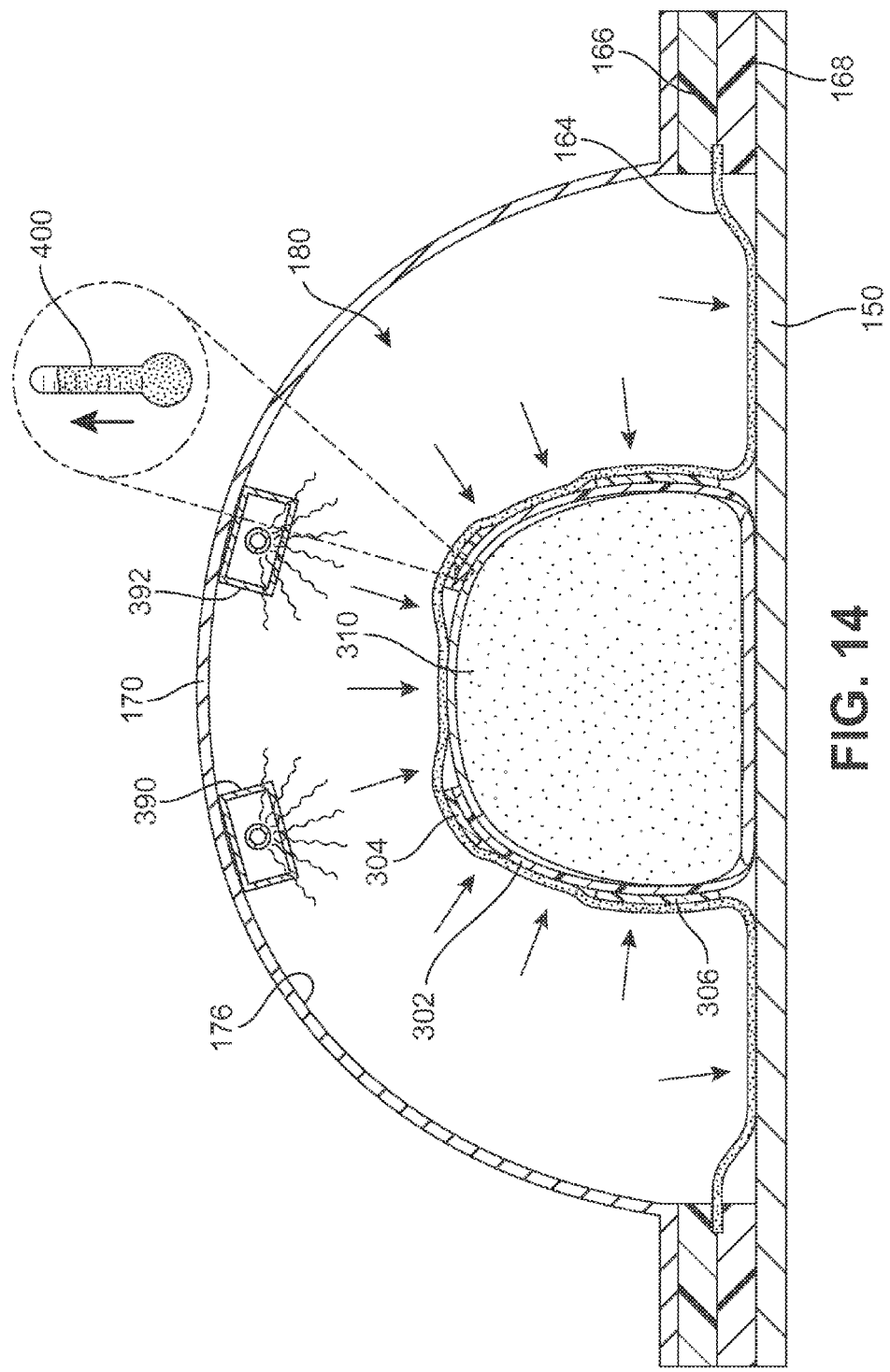
FIG. 14 is a cross sectional view of the components of FIG. 13, in which heat is used to facilitate fusing of materials.
Figure 15:
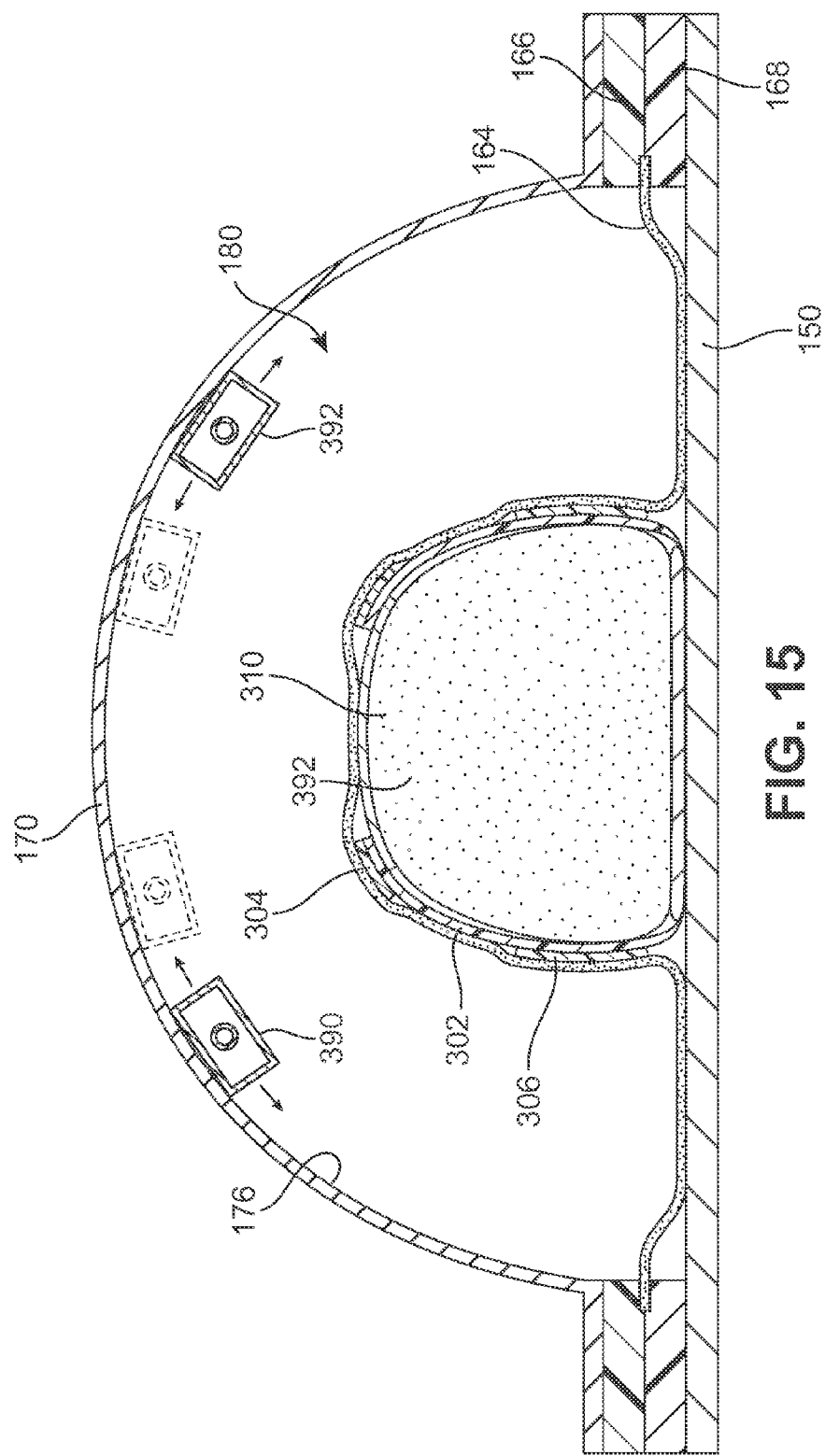
FIG. 15 is a cross sectional view of the components of FIG. 13, in which pressure is decreased within the upper member.

Referring next to FIG. 14, in some embodiments, heat may also be applied simultaneously with pressure, for example, through heating elements disposed within flexible membrane 164 and/or through heating elements associated with upper member 170. In other embodiments, heat can be applied via any other portions of flexible manufacturing system 100 as well as from a separate heat source. In some embodiments, for example, upper member 170 may include one or more heat sources that can be used to heat air within cavity 180. In the exemplary embodiment shown in FIG. 14, upper member 170 includes a first infrared heating lamp 390 and a second infrared heating lamp 392 that may be associated with an interior surface of upper member 170. First infrared heating lamp 390 and second infrared heating lamp 392 may be used to increase the temperature within cavity 180 and to increase the temperature of flexible membrane 164. For purposes of illustration, first infrared heating lamp 390 and second infrared heating lamp 392 are shown schematically in the figures. It will be understood that other embodiments may utilize any number of infrared heating lamps, which may be configured in any arrangement within the interior of cavity 180. In some cases, the positions of one or more heating lamps may be adjustable to accommodate variations in last geometry (e.g., lasts for footwear and lasts for gloves). In still other embodiments, heated air could be used to pressurize cavity 180, which could then act to heat flexible membrane 164 and the underlying layers). As seen in FIG. 15, first infrared heating lamp 390 and second infrared heating lamp 392 may be adjusted to any position within upper member 170, which allows the heat profile within upper cavity 170 to be adjusted.

For purposes of illustration, the difference in temperatures of the material layers prior to heating (FIG. 13) and during heating (FIG. 14) is indicated schematically using temperature indicator 400. In particular, it can be seen that the temperature of base layer 302, first trim layer 304 and second trim layer 304 may be substantially increased as heat is applied. In embodiments where heat may be generated by heating sources within upper member 170, the heat from the air in cavity 180 may then be transferred to flexible membrane 164 and ultimately to base layer 302, first trim layer 304 and second trim layer 306 to facilitate fusing. In other embodiments, heat may be generated directly from heating elements (e.g., electrodes) embedded in flexible membrane 164. In still other embodiments, heat could be generated using heating elements associated with any other components of the system, including for example, heating elements associated with footwear last 310 or heating elements associated with upper member 170.

With this application of pressure and heat, first trim layer 304 and second trim layer 306 may be fused or otherwise bonded to base layer 302. Furthermore, the use of heat and pressure may further act to shape base layer 302 as well as first trim layer 304 and second trim layer 306 so that the resulting footwear upper takes on the desired three-dimensional shape.

Figure 16:
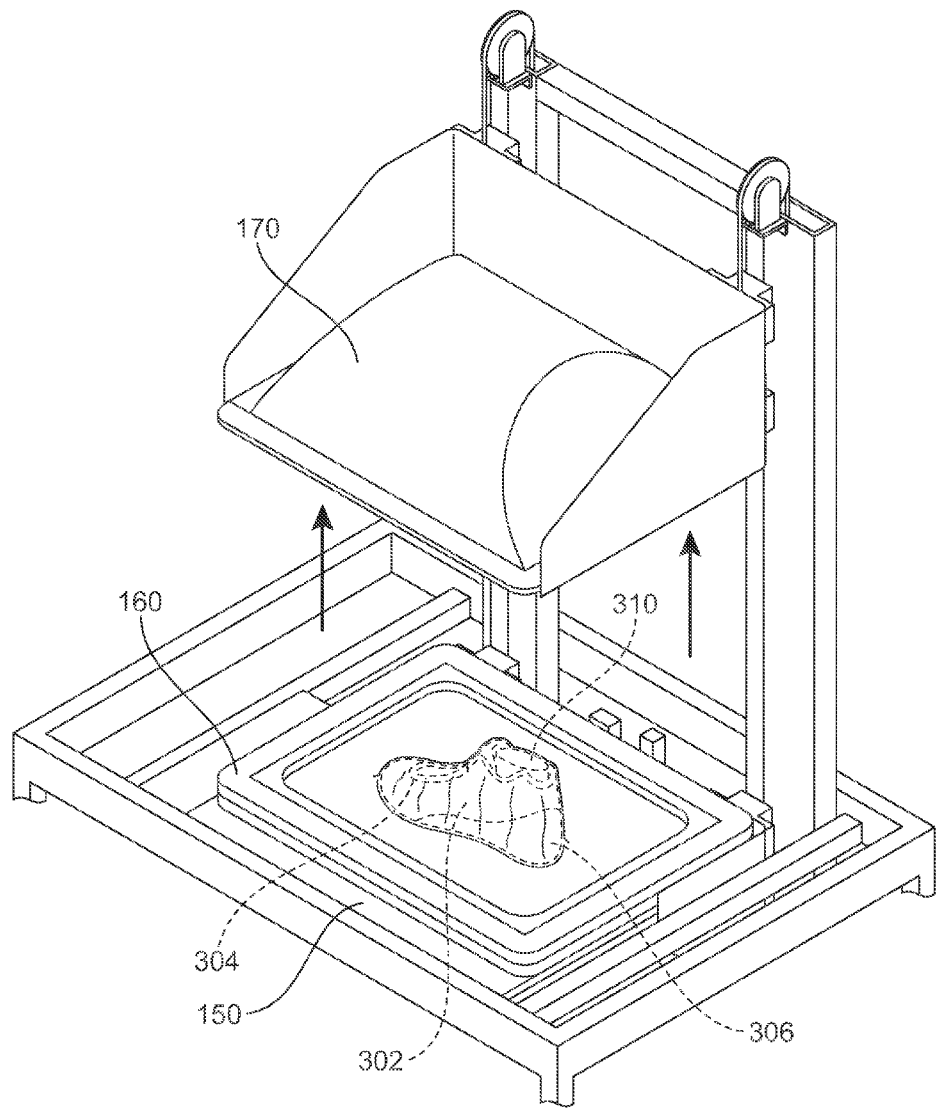
FIG. 16 is an isometric schematic view of an upper member being raised.

In some embodiments, the method of bonding first trim layer 304 and second trim layer 306 to base layer 302 may include cooling the layers while flexible membrane 164 remains pressed against the layers. In some embodiments, this cooling may be achieved by turning off the heat source and further providing improved airflow across flexible membrane 164. To improve airflow across an outer surface of flexible membrane 164, the increased internal pressure of cavity 180 may be lowered (as seen in FIG. 15) and upper member 170 may be raised (as seen in FIG. 16).

Figure 17:
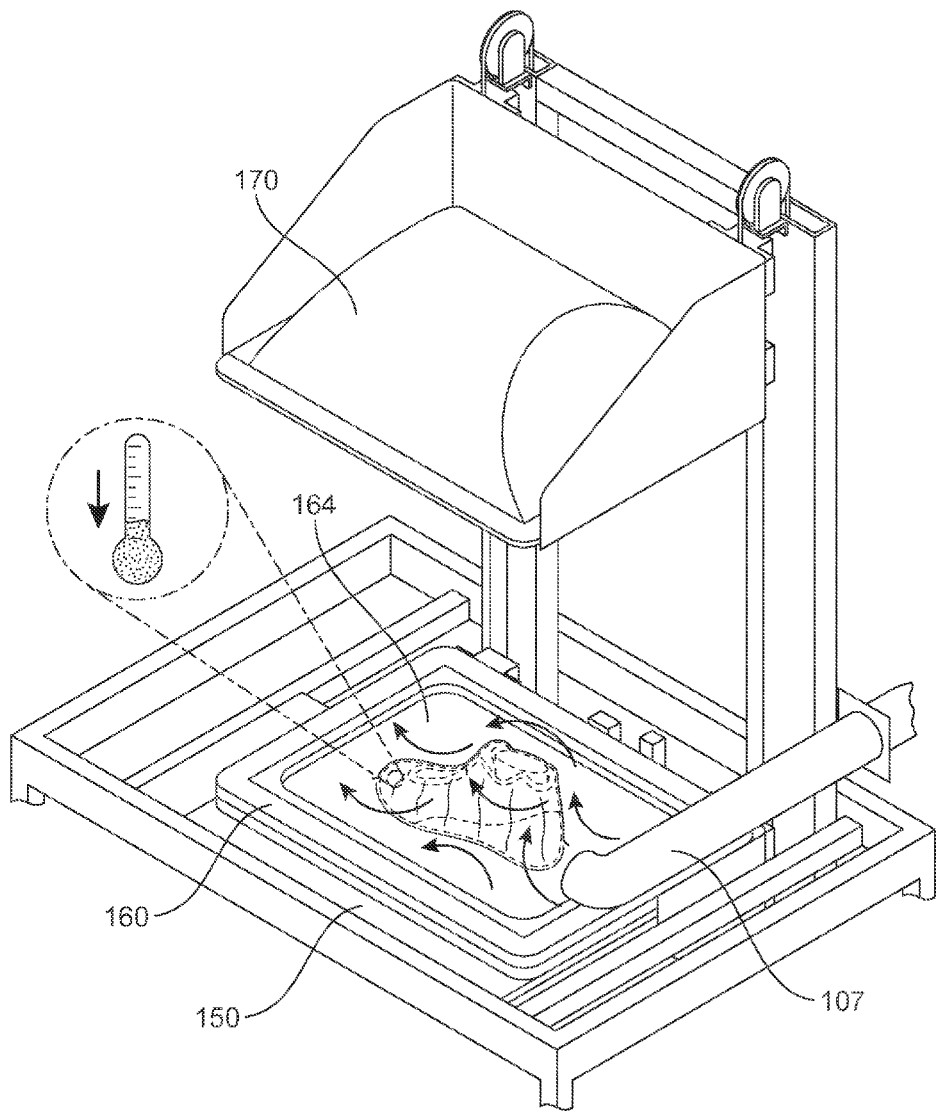
FIG. 17 is an isometric schematic view of an article of footwear cooling.
Figure 18:
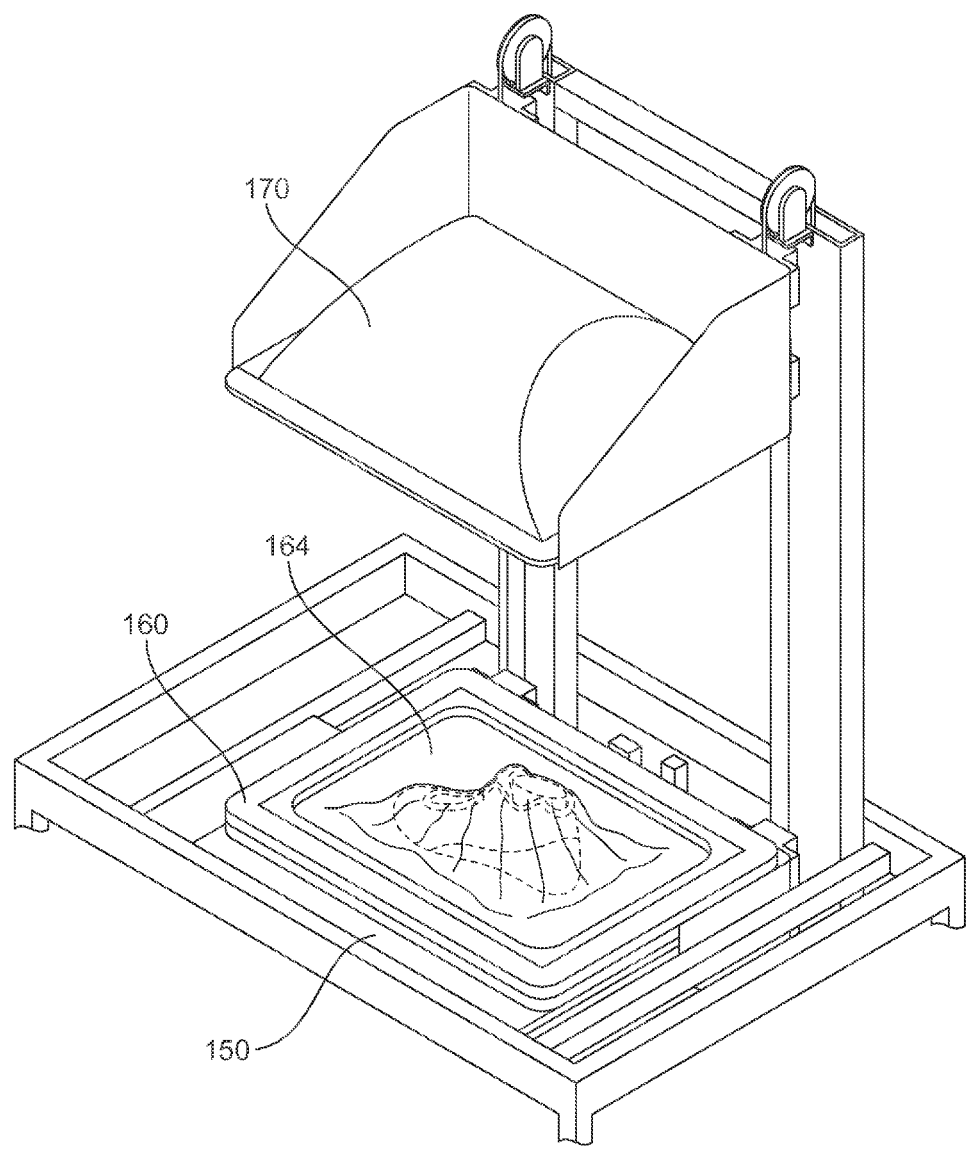
FIG. 18 is an isometric schematic view of an embodiment of a flexible manufacturing system.
Figure 19:
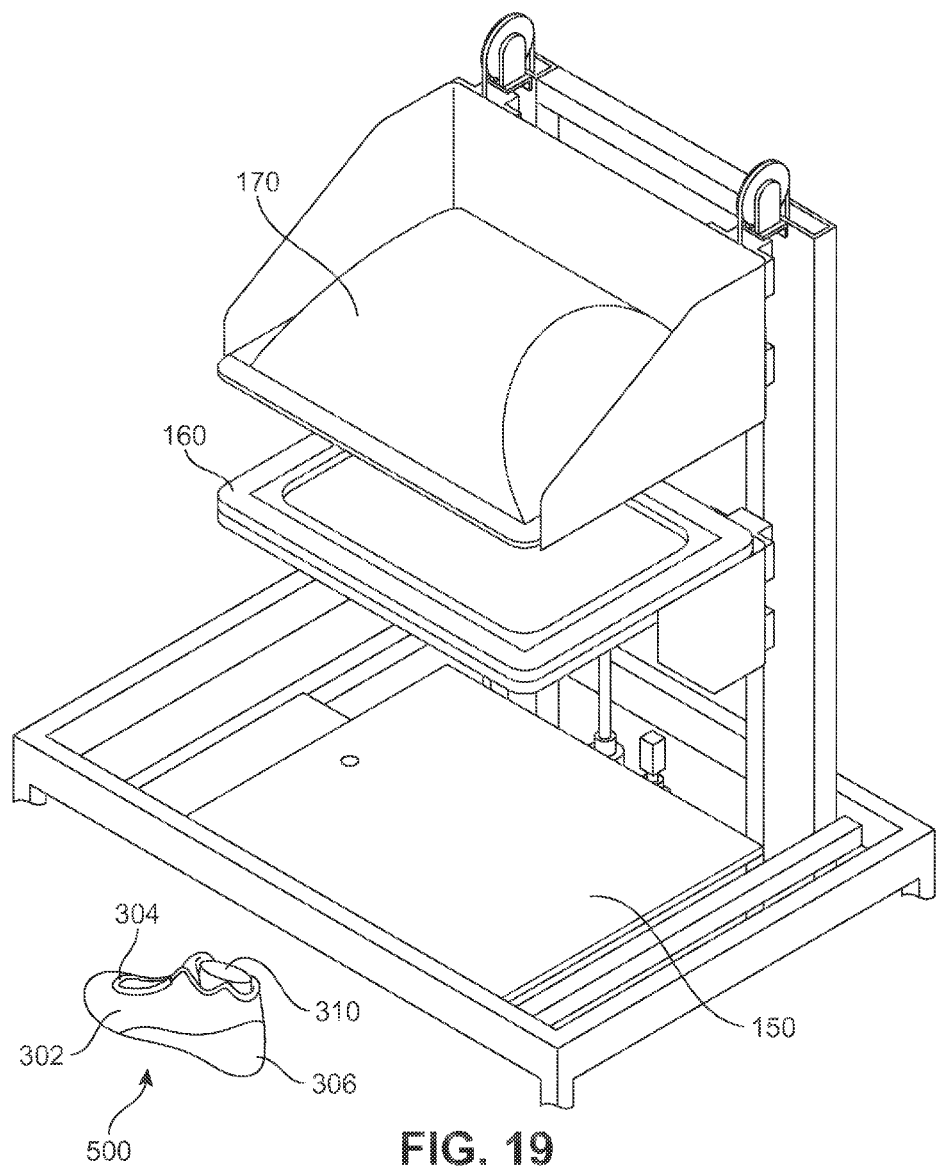
FIG. 19 is an isometric schematic view of an article of footwear with various portions fused together.

As seen in FIG. 17, with a vacuum still used to keep flexible membrane 164 tight against base layer 302, first trim layer 304 and second trim layer 306, ambient airflow may act to cool flexible membrane 164 as well as the underlying layers. In some embodiments, cooling may be further facilitated using a fan or other cooling device. In some embodiments, for example, cool air from an air-conditioning unit could be supplied by first conduit 107 and/or second conduit 109 (not shown). This step of cooling may help set any adhesives used in the bonding process and increase the bond strengths between materials. Finally, the vacuum may be released (FIG. 18), and intermediate member 160 may be raised as seen in FIG. 19. At this point, base layer 302, first trim layer 304 and second trim layer 306 may be fused together in the desired manner to form an upper 500 for an article of footwear.

Figure 20:
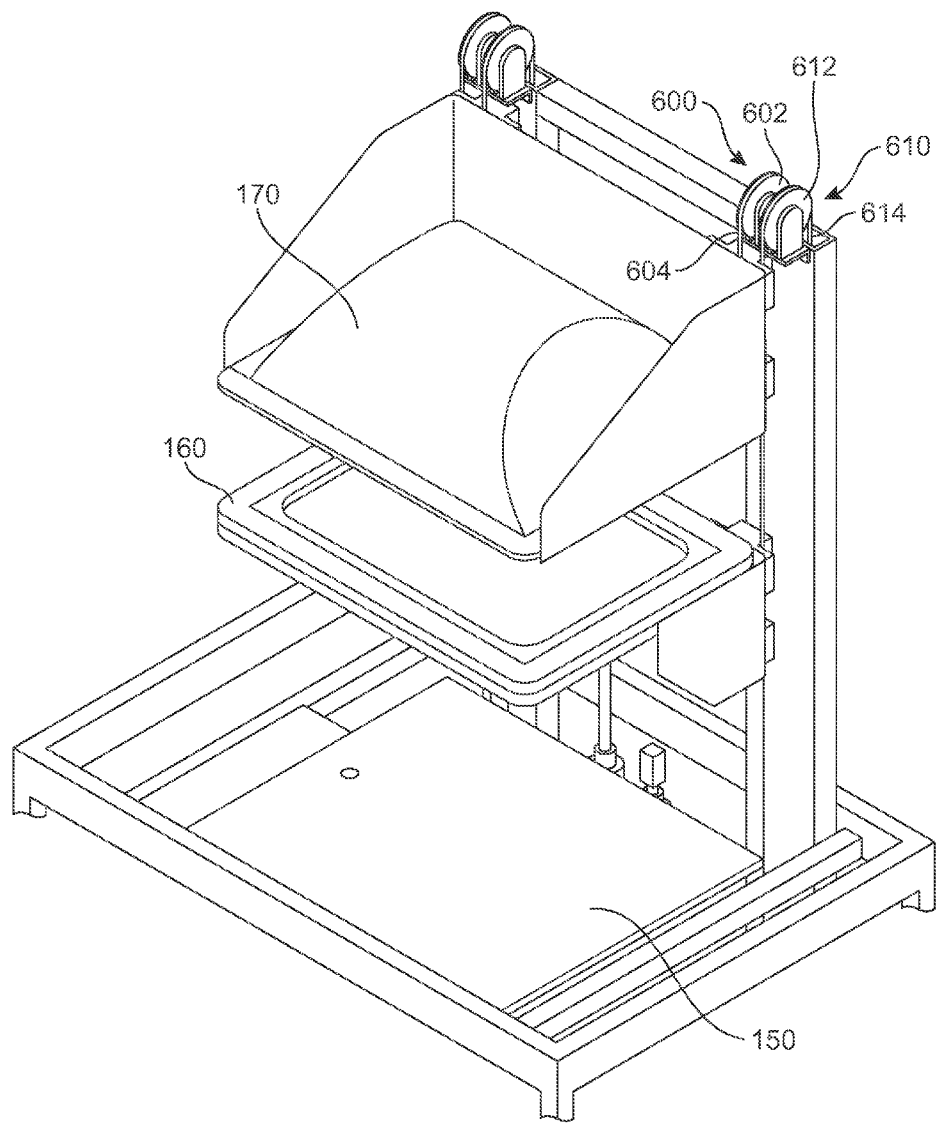
FIG. 20 is a schematic isometric view of some components of an alternate embodiment of a flexible manufacturing system.

FIG. 20 illustrates an alternative system for adjusting the heights of intermediate member 160 and upper member 170. In this embodiment, the heights of upper member 170 and intermediate member 160 may each be controlled using a first height adjustment assembly 600 and a second height adjustment assembly 610, respectively. In particular, first height adjustment assembly 600 may comprise a set of pulleys 602 and corresponding cables 604 for raising and lowering upper member 170. Likewise, second height adjustment assembly 610 may comprise a set of pulleys 612 and a corresponding set of cables 614. Using this arrangement, first height adjustment assembly 600 and second height adjustment assembly 610 may be used to independently raise and lower upper member 170 and intermediate member 160, respectively.

Although the embodiments illustrate uppers where trim layers are joined to a base layer, it will be understood that the same system and methods may be utilized to bond full upper panels to a base layer and/or to one another. In other words, the systems and methods described here are not limited to bonding particular kinds of upper layers and may apply to a variety of different layer types.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A flexible manufacturing system for articles of footwear, comprising:
    a base portion;
    an intermediate member, the intermediate member further including a frame member and a flexible membrane;
    an upper member, the upper member including a cavity;
    wherein the intermediate member can be sealed against the base portion;
    wherein the upper member can be sealed against the intermediate member;
    wherein the flexible manufacturing system can operate so that a vacuum is applied between the intermediate member and the base portion;
    wherein the flexible manufacturing system can operate so that pressure in the cavity between the intermediate member and the upper member can be increased;
    wherein the intermediate member and the upper member can move relative to the base portion and relative to one another;
    wherein the flexible manufacturing system includes at least one support member extending in a direction approximately perpendicular to the base portion and wherein the intermediate member and the upper member are connected to, and supported by, the at least one support member; and
    wherein a first height adjustment system is used to adjust the height of the intermediate member relative to the base portion by moving the intermediate member to different positions along the length of the support member.

2. The flexible manufacturing system according to claim 1, wherein a second height adjustment system is used to adjust the height of the upper member relative to the base portion.

3. The flexible manufacturing system according to claim 2, wherein the height of the upper member relative to the base portion is adjusted by moving the upper member to different positions along the length of the support member.

4. The flexible manufacturing system according to claim 1, wherein the base portion, the intermediate member and a plane corresponding to an outer peripheral edge of the upper member are approximately parallel with one another.

5. The flexible manufacturing system according to claim 1, wherein the upper member has a contoured shape including a convex surface that faces away from the intermediate member.

6. The flexible manufacturing system according to claim 1, wherein the base portion, the intermediate member and the upper member are disposed inside an upper enclosure.

7. A flexible manufacturing system for articles of footwear, comprising:
 a base portion;
 an intermediate member, the intermediate member further including a frame member and a flexible membrane;
 an upper member, the upper member including a cavity;
 wherein the intermediate member is associated with a first height adjustment system that controls the height of the intermediate member above the base portion;
 wherein the upper member is associated with a second height adjustment system that controls the height of the upper member above the base portion; and
 wherein the height of the intermediate member relative to the base portion and the height of the upper member relative to the base portion can be independently controlled.

8. The flexible manufacturing system according to claim 7, wherein the intermediate member is disposed over the base portion.

9. The flexible manufacturing system according to claim 7, wherein the upper member is disposed over the intermediate member.

10. The flexible manufacturing system according to claim 7, wherein the intermediate member is disposed between the base portion and the upper member.

11. The flexible manufacturing system according to claim 1, wherein the first height adjustment system includes a rod portion attached to the intermediate member to adjust the height of the intermediate member.

12. The flexible manufacturing system according to claim 1, wherein the first height adjustment system includes a pulley and a cable to adjust the height of the intermediate member.

13. The flexible manufacturing system according to claim 3, wherein the second height adjustment system includes a pulley and a cable to adjust the height of the upper member.

14. A flexible manufacturing system for articles of footwear, comprising:
 a base portion;
 an intermediate member, the intermediate member further including a frame member and a flexible membrane;
 an upper member, the upper member including a cavity and at least one heating element;
 wherein the intermediate member is associated with a first height adjustment system that controls the height of the intermediate member above the base portion;
 at least one support member connected to the intermediate member and the upper member; and
 wherein the height of the intermediate member is adjusted by moving the intermediate member to different positions along the length of the support member.

15. The flexible manufacturing system according to claim 14, wherein a vacuum is applied between the intermediate member and the base portion.

16. The flexible manufacturing system according to claim 15, wherein pressure in the cavity between the intermediate member and the upper member can be increased.

17. The flexible manufacturing system according to claim 16, wherein heat is applied from the at least one heating element simultaneously with the pressure in the cavity.

18. The flexible manufacturing system according to claim 14, wherein the at least one heating element is positioned along an interior surface of the upper member.

19. The flexible manufacturing system according to claim 14, wherein the at least one heating element includes an infrared heating lamp.

20. The flexible manufacturing system according to claim 14, further comprising a cooling device to cool the flexible manufacturing system.

* * * * *